United States Patent [19]

Scott

[11] 4,432,292
[45] Feb. 21, 1984

[54] FLOATING PLANTER

[76] Inventor: Kenneth G. Scott, Rte. 5, Tahoka, Tex. 79373

[21] Appl. No.: 340,331

[22] Filed: Jan. 18, 1982

[51] Int. Cl.³ .............................................. A01C 5/00
[52] U.S. Cl. ...................................... 111/52; 111/62; 111/85; 111/57
[58] Field of Search ....................... 111/52, 62, 85, 57, 111/83, 66, 67, 86; 172/624.5, 307, 415, 417, 421, DIG. 7

[56] References Cited

U.S. PATENT DOCUMENTS

| | | | |
|---|---|---|---|
| 2,416,189 | 2/1947 | McIntyre | 111/85 |
| 3,970,012 | 7/1976 | Jones, Jr. | 172/624.5 |

FOREIGN PATENT DOCUMENTS 696973 9/1953 United Kingdom ............. 172/624.5

Primary Examiner—Robert A. Hafer
Assistant Examiner—Bradley M. Lewis
Attorney, Agent, or Firm—Wendell Coffee

[57] ABSTRACT

A planter has the seed box and seed dispensing mechanism supported by a tool bar which is supported by tool bar gage wheels and a tractor. A plow moves loose, dry dirt from the seed bed. The plow, opening plow, and covering mechanism are drawn as a unit from the tool bar by a parallel motion linkage. The plow, opening plow, and covering mechanism unit for each row is supported by a planter gage wheel running in front of the plow.

3 Claims, 3 Drawing Figures

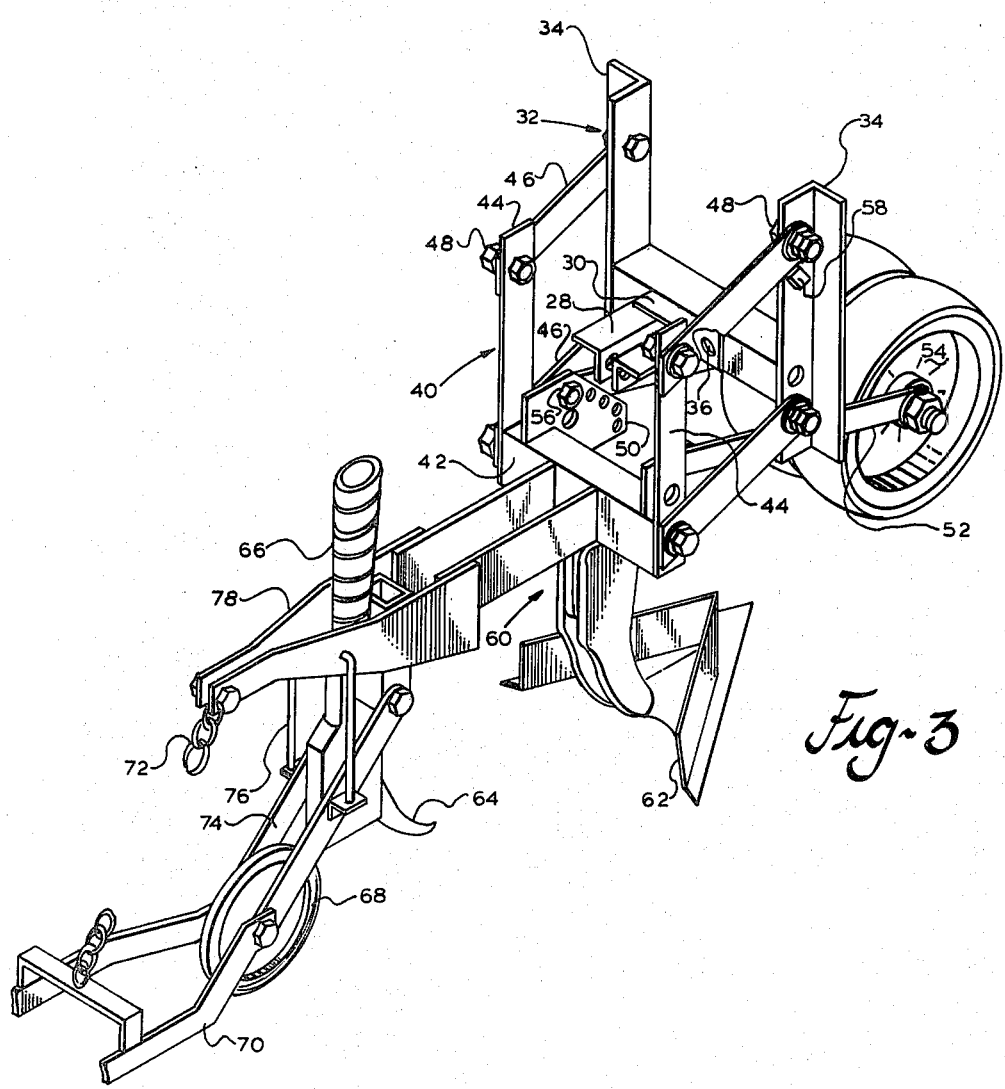

FLOATING PLANTER

BACKGROUND OF THE INVENTION (1) Field of the Invention

This invention relates to agricultural planters and more particularly to planters for crops planted in rows.

(2) Description of the Prior Art

Agriculture today is mechanization. Mechanization requires uniformity. This is particularly true of planting because the seeds must all be planted so that the seedlings emerge from the ground the same time. Not only must the seedlings emerge from the ground at the same time, but ten days or two weeks later all seedings must have approximately a uniform height, so they can be cultivated in a uniform fashion. At a later time, it is necessary that the plants all mature at the same time so they can be mechanically harvested at the same time.

To achieve this uniformity in plants, it is essential that the seeds be planted with great precision. Not only is it necessary that each seed be uniformly spaced from other seeds, but also that the seed depth be achieved with great precision. Not only must the depth of the seed in the furrow be precise, but also the depth of the seed from the top of the ground of the original seed bed should be precise. When the seed bed is planted, normally there will be a layer of dry soil above the planting zone. The moisture content of the seed bed will vary with the depth. Therefore, for optimum results, as well as uniform results, it is desired to plant the seed at a certain particular depth from the original surface of the seed bed, and also have it covered so that it is at a certain depth in the seed bed after planting.

For row crops two basic types of planters are commonly used.

The first type can be characterized as the tool bar carried planter. With this arrangement, the planters for each row are rigidly attached to a tool bar, which extends over several rows; for example: eight rows. If the height of the eight rows is not uniform, the seed will be deposited in some rows too shallow, and in other rows too deeply.

Another type of planter is commonly known as a drag box planter. With this type planter, the lister or double mold is rigidly attached to a tool bar. A planter assembly including a seed box, opening plow, and covering mechanism is drafted or towed behind the lister. However, since the weight of the seed in the seed box is supported by the planting mechanism, which is towed behind the lister, the depth of the seed will vary with the amount of seed in the seed box.

Before this application was filed, a search was made in the United States Patent and Trademark Office. This search revealed the following patents:

McINTYRE, U.S. Pat. No. 2,416,189
TANKE, U.S. Pat. No. 2,687,238
BUHR, U.S. Pat. No. 2,698,114
CAYTON ET AL., U.S. Pat. No. 3,749,035
REUTER, U.S. Pat. No. 4,037,755
BAILEY ET AL., U.S. Pat. No. 4,214,537

CAYTON ET AL discloses a planter having the seed box supported by the tool bar while the opening plow and covering mechanism is drafted behind the tool bar by a parallel motion linkage. CAYTON ET AL does not disclose a plow to remove dry soil from the seed bed before planting the seed. Also, the gage wheels 66 are not the most forward element mounted upon the furrow forming unit.

McINTYRE discloses an opening plow and covering mechanism supported by parallel linkage mechanism, however, the dry soil would be removed by the plow or sweep 20 mounted rigid to the tool bar. Also, McINTYRE does not appear to have gage wheels.

The other four patents do not appear as pertinent as the CAYTON ET AL and McINTYRE patents as specifically discussed above. The pertinency of these other four patents appear to be mainly that the searcher, in making a search for this invention, considered they might be of some interest.

SUMMARY OF THE INVENTION (1) New and Different Function

I have invented a planter to achieve the desired uniformity of planting the seed at a uniform depth, both from the original seed bed and to the finished seed bed. I use a tool bar which supports equipment for eight rows, i.e. 280 inches. All of the seed boxes are supported on the tool bar, and the weight of the tool bar and seed boxes is carried by the towing tractor and the tool bar gage wheels. The mechanism which regulates the depth of the seed from the original seed bed and the depth of the seed within the seed bed after planting is all carried on a separate subframe assembly drafted behind the tool bar.

The elements that regulate the depth are: (a) the earthworking implement, such as a plow, to move dry dirt from the seed bed in front of the opening plow, (b) the opening plow itself together with the seed chute which drops the seed behind the opening plow, and (c) the seed covering mechanism which includes a presswheel and a covering drag.

The elevation or the height of these elements is regulated by separate gage wheels for each row. These gage wheels extend forward of the plow so that the height of all the elements is regulated from the height of the undisturbed seed bed. Therefore, the amount of dirt that is moved from each row is regulated by the gage wheels for that row only. The opening plow for each row is a certain set distance below the level of the gage wheels, which operate for that row only. Although the presswheel and covering drag "float" behind the opening plow and seed chute, the pressure exerted by them is controlled by the same assembly that carries the plow which moves the dry dirt from the seed bed.

The process, which accomplishes this desired uniformity, includes mounting all of the equipment to a parallel motion linkage so that it is carried in parallel relationship behind the main tool bar.

It will be understood that the equipment is normally for a large number of rows, for example, eight rows. Although the farmer attempts to achieve uniformity between the eight rows extending over 280 inches, some of the rows will be higher in certain locations than other rows because of the undulating farm land.

(2) Objects of this Invention

An object of this invention is to plant seed in rows.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a rear perspective view of the equipment removed from the tool bar.

DESCRIPTION OF THE PREFERRED EMBODIMENT

Figure 1:
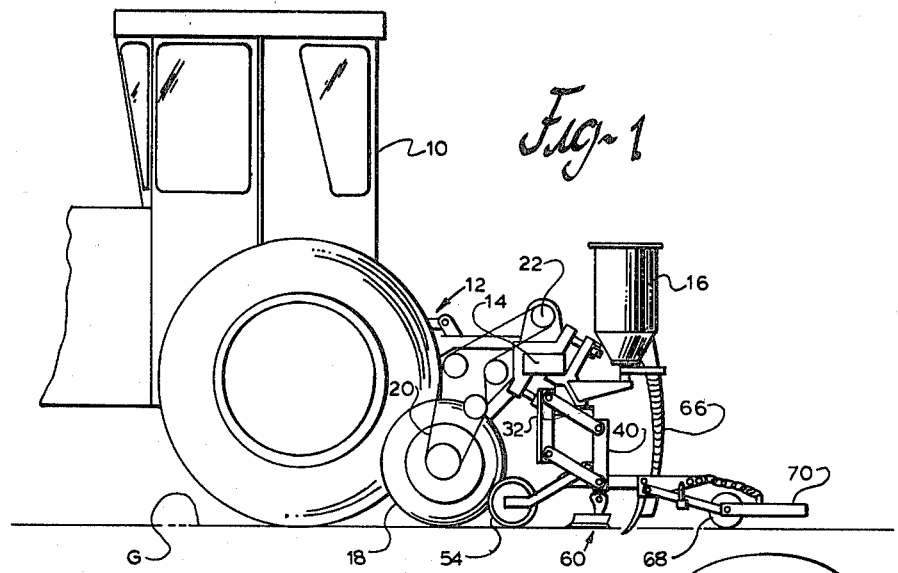
FIG. 1 is a side elevational view of tractor and tool bar with an embodiment of this invention attached thereto.

Referring to the drawing, there may be seen represented tractor 10, which is attached by conventional hitch 12 to tool bar 14. It will be understood that the hitch 12 not only supports the tool bar 14, at least in part, but also forms a draft means for drafting the tool bar through the field to be planted. Seed boxes 16 are mounted upon the tool bar 14. Tool bar gage wheels 18 are attached to the tool bar 14. The gage wheels 18 likewise, at least partially, support the tool bar 14. They form a precision support for the tool bar 14 so that the tool bar is always maintained at a proper height above the ground "G". As is common and customary in agricultural planters, chain 20 runs between a sprocket on the gage wheel 18 and a sprocket on shaft 22. The shaft 22 is connected to the seed boxes 16 in driving relationship. Thus mechanical transmission means connect the gage wheels 18 and the seed boxes 16 for driving the seed boxes.

Those having skill in the art will understand that all that has been specifically described to this point is old and well-known.

Figure 2:
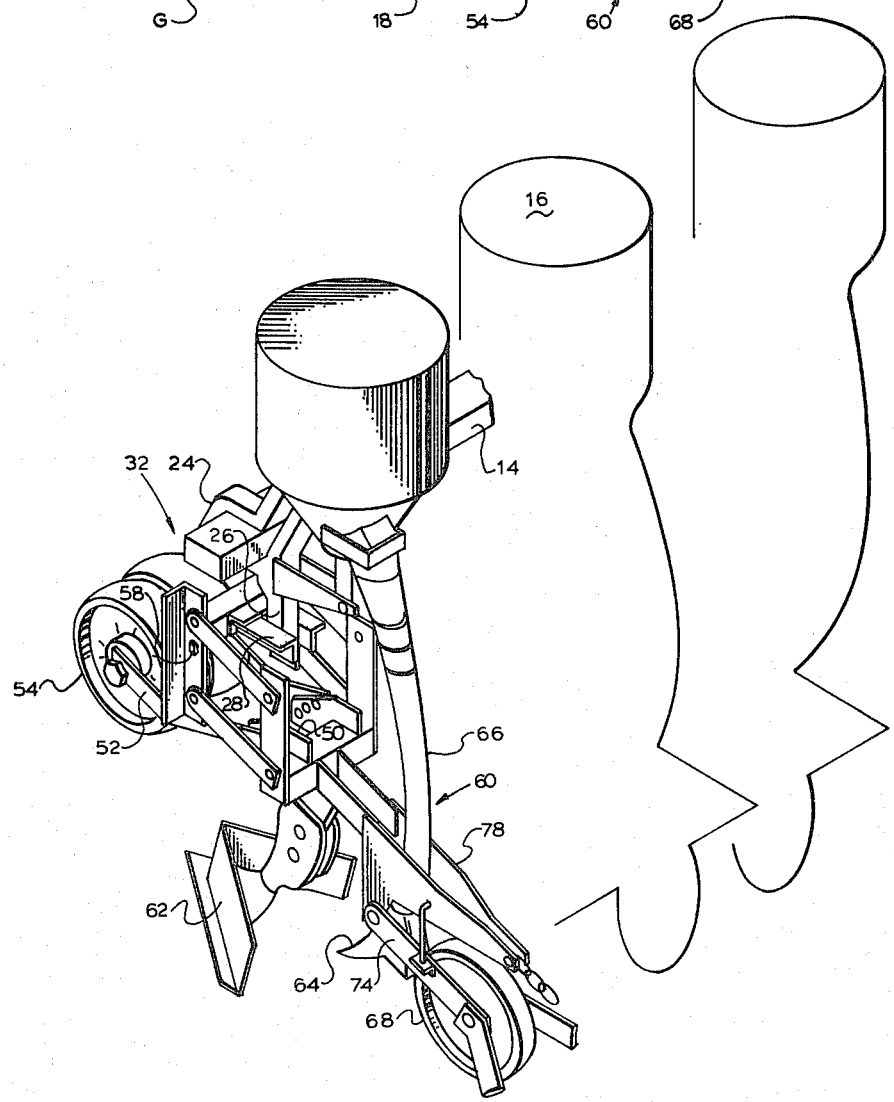
FIG. 2 is a rear perspective view of the invention.

Clamp 24 encircles the tool bar 14. The clamp supports the seed box 16. The clamp 24 includes leg 26 which depends therefrom. (FIG. 2) Adapter beam 28 extends on either side of the leg 26 and extends forward therefrom to adapter plate 30.

The adapter plate 30 is bolted to a cross member of first link 32. The first link includes the crossbar and two vertical angle irons 34.

It will be understood, that basically all of the commercial planter units on the market today have a clamp such as clamp 24 which supports the seed box 16 and have a depending leg 26 with which to attach the remainder of the planter unit. However, the different manufacturers have different shapes and sizes of these depending legs 26. Therefore, the adapter beams 28 will be different for different manufacturers and makes of planter equipment. However, in each instance they will terminate with a standard adapter plate 30, which therefore can attach to a standard first link 32.

As seen in FIG. 3 the adapter plate 30 has slots 36 therein so that the first link 32 is adjustably connected to the adapter plate 30. Therefore it may be seen that the first link 32 is adjustably connected to the tool bar 14.

Third link 40 includes crossbar 42 and two vertical angle irons 44. The angle irons 34 and 44 each have two holes therethrough. The space between the two holes is the same for all angle irons. Two draft bars 46 form the second and fourth link of a four-bar linkage mechanism, the link 32 forming the first link and the link 40 being the third link. The draft bars 46 each have two holes therein. The distance between the two holes is the same for all four draft bars 46. Eight bolts 48 (four on each side) form pivots to connect the four-bar linkage mechanism. As may be seen, the four-bar linkage mechanism is a parallel motion mechanism. The first and third links will always be parallel. The second and fourth links will always be parallel.

Two plates 50 extend forward from the crossbar 42. Gage arms 52 are connected to the plates 50. Planter gage wheels 54 are journaled to gage arms 52. The plates 50 have a plurality of holes therein. A pin is permanently placed through the lowermost holes. This lowermost pin will prohibit the planter gage wheels 54 from dropping below a certain level. The gage arms 52 are pivoted to the plates by bolt 56. A pin is placed within one of the holes above a gage arm 52. This upper pin limits how far the crossbar 42 and all of the equipment attached to the crossbar may drop when the gage wheels 54 are running upon the soil.

It will be understood that the hitch 12 may be used to raise the tool bar 14 and thus the first link 32. The third link 40 can drop down only a limited amount because of stop 58 welded to the first link 32. Therefore, the stop 58 limits the amount the crossbar 42 may drop below the tool bar 14. The lower pin in the plates 50 limits the amount the gage wheels 54 may drop below the crossbar 42, when the tool bar 14 and crossbar 42 are raised by the hitch 12.

Although one specific attachment of the arms 52 to the plates 50 have been described, those having ordinary skill in the art will understand that there are many ways in which the arms 52 could be adjustably attached to the crossbar 42 to achieve the objectives, i.e. limiting the amount the crossbar 42 descends when the gage wheels are riding upon the earth, and the amount the gage wheels 54 descend when the planter unit is raised and supported by the tool bar 14.

The crossbar 42 and all of the material attached to it is referred to herein as subframe 60. Earthworking implement 62 is attached to the subframe 60 immediately below the crossbar 42. As seen, the earthworking implement 62 is in the form of a buffer sweep. The purpose of the buffer sweep is to act as a scraper to scrape or move dry soil from the seed row. The earthworking implement could take the form of a scraper or a buffer seep or of a lister. In any event, the purpose of the earthworking implement is the same: to move dry dirt from the seed row.

As used herein the seed row means that line or row along the ground "G" wherein the seeds are planted or will be planted.

As may be seen, the planter gage wheels 54 run in front of the earthworking implement 62 so that they accurately regulate the height of the earthworking implement relative to the undisturbed dry soil.

Opening plow 64 is attached to the subframe 60 behind the earthworking implement 62. Flexible seed chute 66 extends from the seed box 16 to immediately behind the opening plow 64. The seed chute 66 is lightweight and adds very little weight to the subframe 60. Although the subframe 60 supports the seed chute 66, actually most of the weight of the seed chute 66 will be carried depending from the seed box 16.

Press wheel 68 and drag 70 are attached to trail immediately behind the opening plow 64 and seed chute 66 in a conventional manner. They are pivoted so they float. The downward travel of them is limited by chain 72 so that when the equipment is raised by the power lift, the drag 70 is supported above the ground.

The details of construction may be seen in the drawings. The presswheel is journaled for rotation between two arms 74. The downward limit of travel of the presswheel 68 is limited by bolts 76 which depend from spur 78. The chain 72 extends between the spur 78 and the drag 70.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| "G" ground | 44 angle irons |
| 10 tractor | 46 draft bars |
| 12 hitch | 48 linkage bolts |
| 14 tool bar | 50 arm plates |
| 16 seed boxes | 52 gage arms |
| 18 tool bar gage wheels | 54 planter gage wheels |
| 20 chain | 56 pivot bolt |
| 22 shaft | 58 stop |
| 24 clamp | 60 subframe |
| 26 leg | 62 earthworking implement |
| 28 adapter beam | 64 opening plow |
| 30 adapter plate | 66 chute |
| 32 first link | 68 presswheel |
| 34 angle iron | 70 drag |
| 36 slot | 72 chain |
| 38 | 74 cover arms |
| 40 third link | 76 bolts |
| 42 crossbar | 78 spur |

I claim as my invention:
1. In a planter having
a tool bar,
draft means on the tool bar for drafting it through a field to be planted,
a plurality of seed boxes on the tool bar,
tool bar gage wheels on the tool bar to run on the ground for maintaining the tool bar at proper height,
mechanical transmission means connecting the gage wheels to the seed boxes for driving the seed boxes, and for each seed box:
an earthworking implement to move the dry dirt from the seed row,
an opening plow to form a furrow,
a seed chute extending from the seed box and attached behind the opening plow, and
cover means for closing the furrow thus covering the seed in the furrow;
wherein the improved structure for each seedbox comprises: a subframe with said implement, opening plow, and cover means attached to the subframe,
a parallel motion four-bar linkage connecting the subframe to said tool bar with
(i) a first link operatively connected to the tool bar,
(ii) a third link connected to the subframe, and
(iii) a second and fourth link connected to the first and third link,
a planter gage wheel attached to the subframe in front of the implement,
a clamp attached to the tool bar for each of said seed boxes,
said seed box attached to said clamp,
an adapter beam attached to said clamp,
said first link operatively connected to said adapter beam thus connecting said first link to the tool bar as recited above, and
means for angularly adjusting the first link to the adapter beam.

2. The invention as defined in claim 1 further comprising:
an arm pivoted to the subframe at an arm pivot,
said planter gage wheel journaled to the arm, and
adjustment means on the subframe for limiting the downward movement of the subframe relative to the planter gage wheel,
so that the planter gage wheel limits the depth at which the seeds are planted.

3. In a planter having
a tool bar,
draft means on the tool bar for drafting it through a field to be planted,
a plurality of seed boxes on the tool bar,
tool bar gage wheels on the tool bar to run on the ground for maintaining the tool bar at proper height,
mechanical transmission means connecting the gage wheels to the seed boxes for driving the seed boxes, and for each seed box:
an earthworking implement to move the dry dirt from the seed row,
an opening plow to form a furrow,
a seed chute extending from the seed box and attached behind the opening plow, and
cover means for closing the furrow thus covering the seed in the furrow;
wherein the improved structure for each seedbox comprises: a subframe with said implement, opening plow, and cover means attached to the subframe,
a parallel motion four-bar linkage connecting the subframe to said tool bar with
(i) a first link connected to the tool bar,
(ii) a third link connected to the subframe, and
(iii) a second and fourth link connected to the first and third link,
a planter gage wheel attached to the subframe in front of the implement,
a clamp on said tool bar attaching said seed boxes thereto,
a leg depending from said clamp,
an adapter beam bolted to said leg,
an adapter plate attached to said adapter beam,
said adapter plate adjustably connected to said first link thereby connecting said first link to said tool bar as defined above,
a plate attached to the subframe,
an arm pivoted to the plate,
said planter gage wheels journaled to the arm,
adjustment means on the plate for limiting the downward movement of the subframe relative to the planter gage wheel,
so that the planter gage wheel limits the depth to which the seeds are planted, cover arms extending rearwardly from said subframe at the opening plow, a spur extending rearwardly from the subframe at the opening plow, a presswheel journaled to said cover arms, a drag attached behind said presswheel to said cover arm, and a chain extending from said spur to said drag, and limit bolts extending from said spur to said cover arms, said presswheel and drag forming said cover means.

* * * * *